US011845567B2

(12) United States Patent
Truess et al.

(10) Patent No.: US 11,845,567 B2
(45) Date of Patent: Dec. 19, 2023

(54) AUTOMATED TRIM AND INSTALLATION TOOLS FOR AIRFRAME COMPONENTS AT A MOVING LINE

(71) Applicant: The Boeing Company, Chicago, IL (US)

(72) Inventors: Jeffrey Alan Truess, Mukilteo, WA (US); Richard Calawa, Mukilteo, WA (US); Justin Michael Foisy, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 17/524,065

(22) Filed: Nov. 11, 2021

(65) Prior Publication Data

US 2022/0177160 A1 Jun. 9, 2022

Related U.S. Application Data

(60) Provisional application No. 63/123,320, filed on Dec. 9, 2020.

(51) Int. Cl.
*B64F 5/10* (2017.01)
*B64C 1/14* (2006.01)
*B25B 11/00* (2006.01)

(52) U.S. Cl.
CPC ............ *B64F 5/10* (2017.01); *B64C 1/1407* (2013.01); *B25B 11/005* (2013.01); *B64C 1/14* (2013.01)

(58) Field of Classification Search
CPC ........... B23C 3/16; B23C 3/122; B23C 3/124; B23C 3/18; B23C 2215/04; B64F 5/10; B64F 5/40; B64C 1/1407; B64C 1/12; B23P 2700/01; Y10T 29/49622; Y10T 29/49623; Y10T 29/49625; Y10T 29/49629;

(Continued)

(56) References Cited

U.S. PATENT DOCUMENTS

| | | | | |
|---|---|---|---|---|
| 5,249,785 | A | * | 10/1993 | Nelson .................. B25B 11/005 269/21 |
| 6,430,796 | B1 | * | 8/2002 | Jones ...................... B23P 23/00 29/34 B |
| 2005/0260051 | A1 | * | 11/2005 | Hamann ................... B64C 1/12 409/131 |

OTHER PUBLICATIONS

Conveyor; Automotive Conveyors & Systems; http://centralconveyor.com/automotive; Sep. 17, 2020.

(Continued)

*Primary Examiner* — Lee D Wilson
*Assistant Examiner* — Alberto Saenz
(74) *Attorney, Agent, or Firm* — Duft & Bornsen, PC

(57) ABSTRACT

Systems and methods are provided for trimming and installation. One embodiment is a system for cutting out portions of a fuselage section. The system includes an Inner Mold Line (IML) tool comprising an inner gripping element configured to apply suction to a portion of the fuselage section, and further comprising an outer gripping element configured to apply suction to an area surrounding the portion, an Outer Mold Line (OML) tool configured to operate a cutter to cut the portion out from the fuselage section while suction is applied to the portion and to the area surrounding the portion, and a track that is disposed between the IML tool and the OML tool, wherein the fuselage section is configured to be pulsed in a process direction along the track, such that the fuselage section remains disposed between the IML tool and the OML tool when pulsed in the process direction.

20 Claims, 18 Drawing Sheets

(58) Field of Classification Search
CPC . Y10T 409/305264; Y10T 409/305656; Y10T 409/305768; Y10T 409/305824; Y10T 409/307728; Y10T 409/308288; B23Q 1/01; B23Q 1/012; B23Q 1/015; B23Q 1/017; B23Q 1/621; B23Q 3/02; B23Q 3/06; B23Q 3/065; B25B 11/005
USPC .............................................. 29/559; 483/36
See application file for complete search history.

(56) References Cited

OTHER PUBLICATIONS

Electroimpact; Part Conveyor-Friction Drive.
Friction Conveyor System; Nakanishi Metal Works Co., Ltd.; www.nkc-j-co.jp/eng/yusoki/y; Sep. 17, 2020.

* cited by examiner

CUTTING POSITION

DISPOSAL POSITION

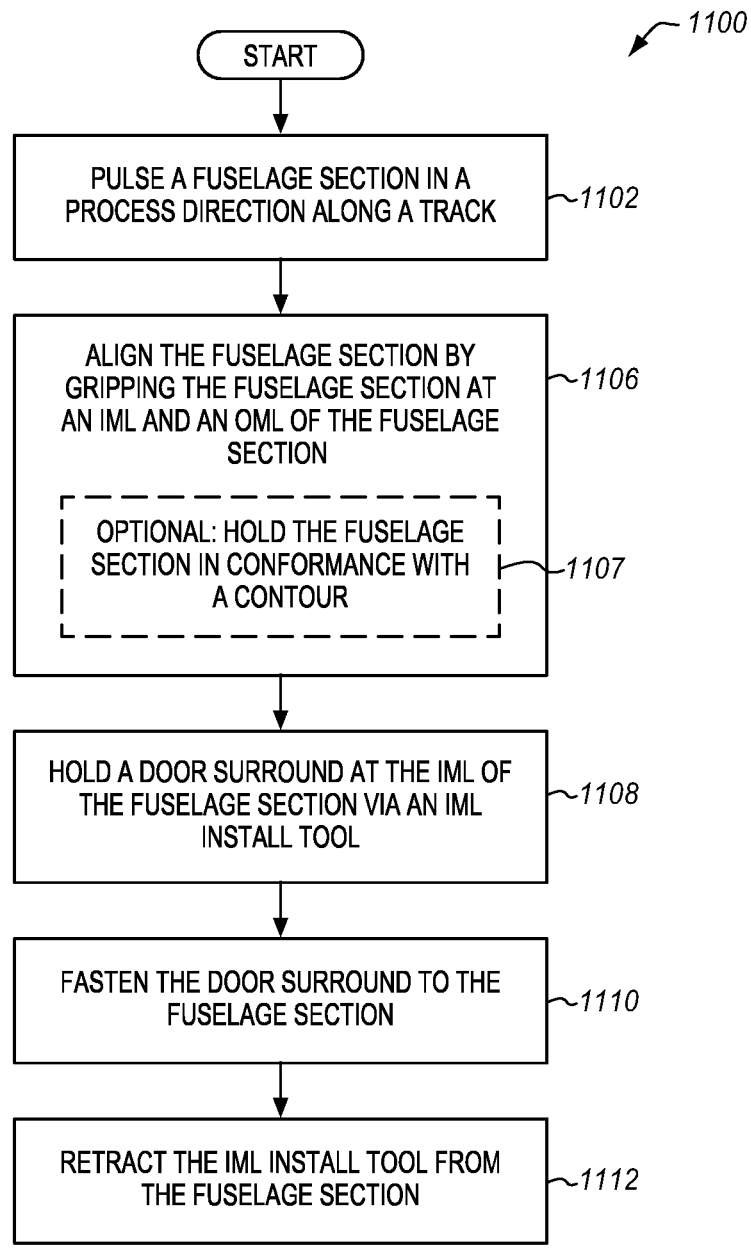

AUTOMATED TRIM AND INSTALLATION TOOLS FOR AIRFRAME COMPONENTS AT A MOVING LINE

RELATED APPLICATIONS

This non-provisional patent application claims priority to U.S. Provisional Patent Application No. 63/123,320, filed on Dec. 9, 2020.

FIELD

The disclosure relates to the field of aircraft, and in particular, to fabrication of aircraft.

BACKGROUND

Large composite parts, such as those spanning tens of feet, occupy substantial space within a factory floor. For example, a single fuselage section for an aircraft may occupy forty linear feet or more. Such composite parts often require a variety of complex tasks to be performed upon them, such as cut-out operations, frame installation, inspection, edge sealing, painting, and other operations. To receive work for new tasks, the composite part is transported to a new cell on the factory floor, affixed in place, and indexed. However, tasks such as cutting out windows or doors may require the installation of braces or other components in order to replace the stiffness of the removed structure and ensure that a desired amount of loft is enforced at the fuselage section. This occupies a substantial amount of time and resources.

Therefore, it would be desirable to have a method and apparatus that take into account at least some of the issues discussed above, as well as other possible issues.

SUMMARY

Embodiments described herein provide for integrated cut-out stations that are disposed along an assembly line for composite parts. By pulsing the composite parts fractionally (i.e., by less than their length) in a process direction along the assembly line, the cut-out stations are exposed to new portions of the composite parts after each pulse. Fractional pulsing of the composite parts (e.g., past the cut-out stations) enables the cut-out stations to rapidly and repeatedly perform cut-out operations, for example, without needing to be repositioned or adjusted. In one embodiment, fractional pulsing of a composite part, such as a fuselage section, past the cut-out stations enables all windows and/or doors in that fuselage section to be rapidly and precisely cut-out, without the need for moving the cut-out stations themselves.

One embodiment is a system for cutting out portions of a fuselage section. The system includes an Inner Mold Line (IML) tool comprising an inner gripping element configured to apply suction to a portion of the fuselage section, and further comprising an outer gripping element configured to apply suction to an area surrounding the portion, an Outer Mold Line (OML) tool configured to operate a cutter to cut the portion out from the fuselage section while suction is applied to the portion and to the area surrounding the portion, and a track that is disposed between the IML tool and the OML tool, wherein the fuselage section is configured to be pulsed in a process direction along the track, such that the fuselage section remains disposed between the IML tool and the OML tool when pulsed in the process direction.

Another embodiment is a method for cutting out portions of a fuselage section. The method includes pulsing the fuselage section in a process direction along a track, gripping a portion of the fuselage section with an inner gripping element during a pause between pulses, gripping an area surrounding the portion with an outer gripping element during the pause, and cutting the portion out from the fuselage section while gripping the portion and the area surrounding the portion.

A further embodiment is a system for installing door surrounds at a fuselage section. The system includes an indexing tool and a clamp that are configured to align the fuselage section by gripping the fuselage section at an Inner Mold Line (IML) and an Outer Mold Line (OML) of the fuselage section, an IML install tool that is configured to hold a door surround at the fuselage section and retract from the fuselage section, a tack tool that is configured to fasten the door surround to the fuselage section, and a track that is disposed between the indexing tool and the clamp, wherein the fuselage section is configured to be pulsed along the track in a process direction, such that the fuselage section remains disposed between the indexing tool and the clamp when pulsed in the process direction.

A further embodiment is a method for installing door surrounds at a fuselage section. The method includes pulsing the fuselage section in a process direction along a track, aligning the fuselage section by gripping the fuselage section at an Inner Mold Line (IML) and an Outer Mold Line (OML) of the fuselage section, holding a door surround at the IML, of the fuselage section via an IML install tool, fastening the door surround to the fuselage section, and retracting the IML install tool from the fuselage section.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 is a flowchart illustrating a method for installing a door surround onto a fuselage section in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The fuselage sections and door surrounds provided herein are implemented as composite parts in many embodiments. Composite parts, such as Carbon Fiber Reinforced Polymer (CFRP) parts, are initially laid-up in multiple layers that together are referred to as a preform. Individual fibers within each layer of the preform may be aligned parallel with each other, but different layers exhibit different fiber orientations in order to increase the strength of the resulting composite part along different dimensions. Furthermore, some layers may comprise woven fabric made from fibers. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
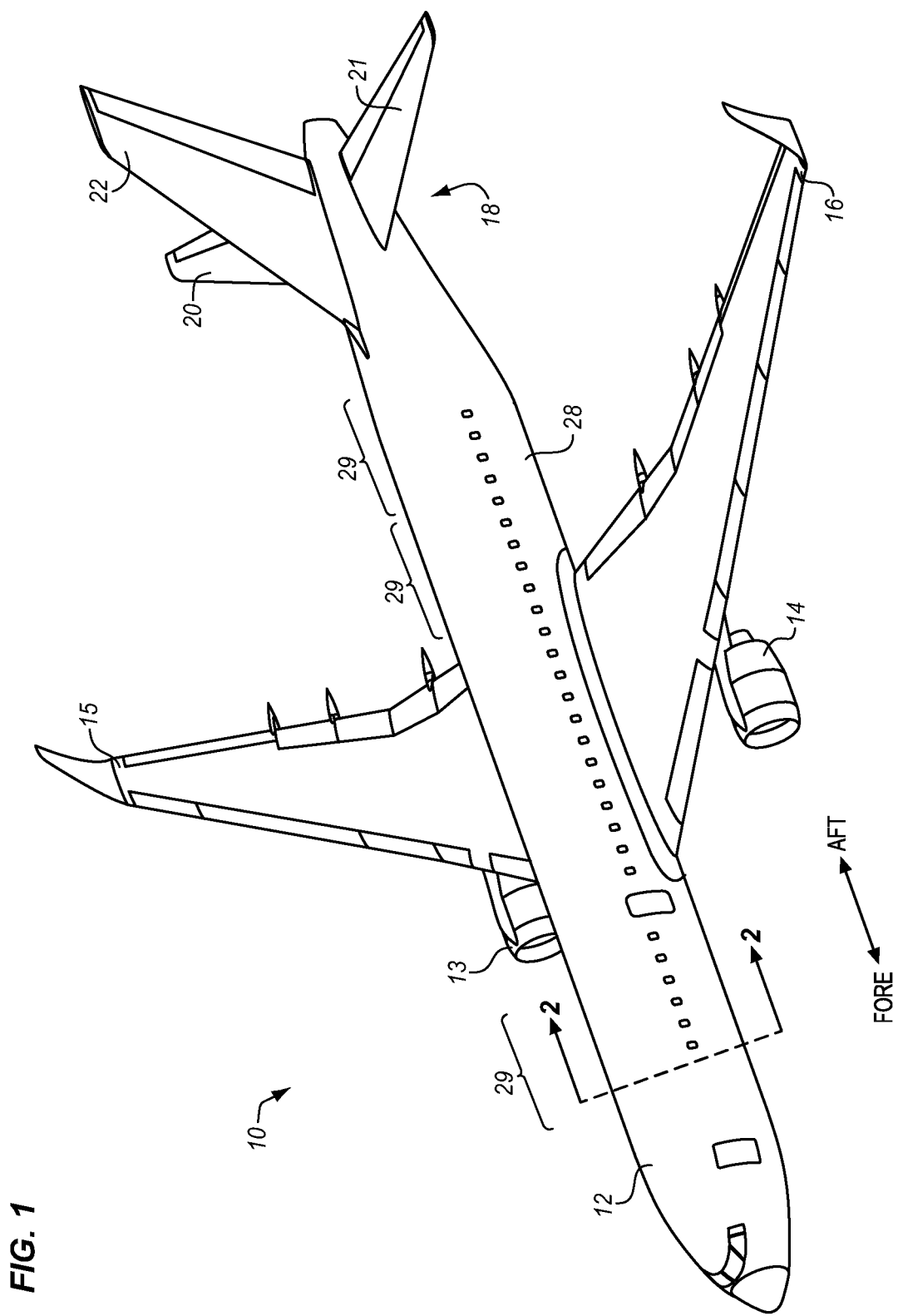
FIG. 1 illustrates an aircraft in an illustrative embodiment.

Turning now to FIG. 1, an illustration of an aircraft 10 is depicted for which the fabrication systems and methods described herein may be implemented. In this illustrative example, aircraft 10 includes wing 15 and wing 16 attached to fuselage 28 having a nose 12. Aircraft 10 includes engine 13 attached to wing 15 and engine 14 attached to wing 16. Tail section 18 is also attached to fuselage 28. Horizontal stabilizer 20, horizontal stabilizer 21, and vertical stabilizer 22 are attached to tail section 18 of fuselage 28. The fuselage 28 itself is formed from multiple barrel sections 29 which have been joined together. In this embodiment, three instances of barrel sections 29 are labeled, but any suitable number of barrel sections 29 may be utilized to form the fuselage 28 as a matter of design choice.

Figure 2:
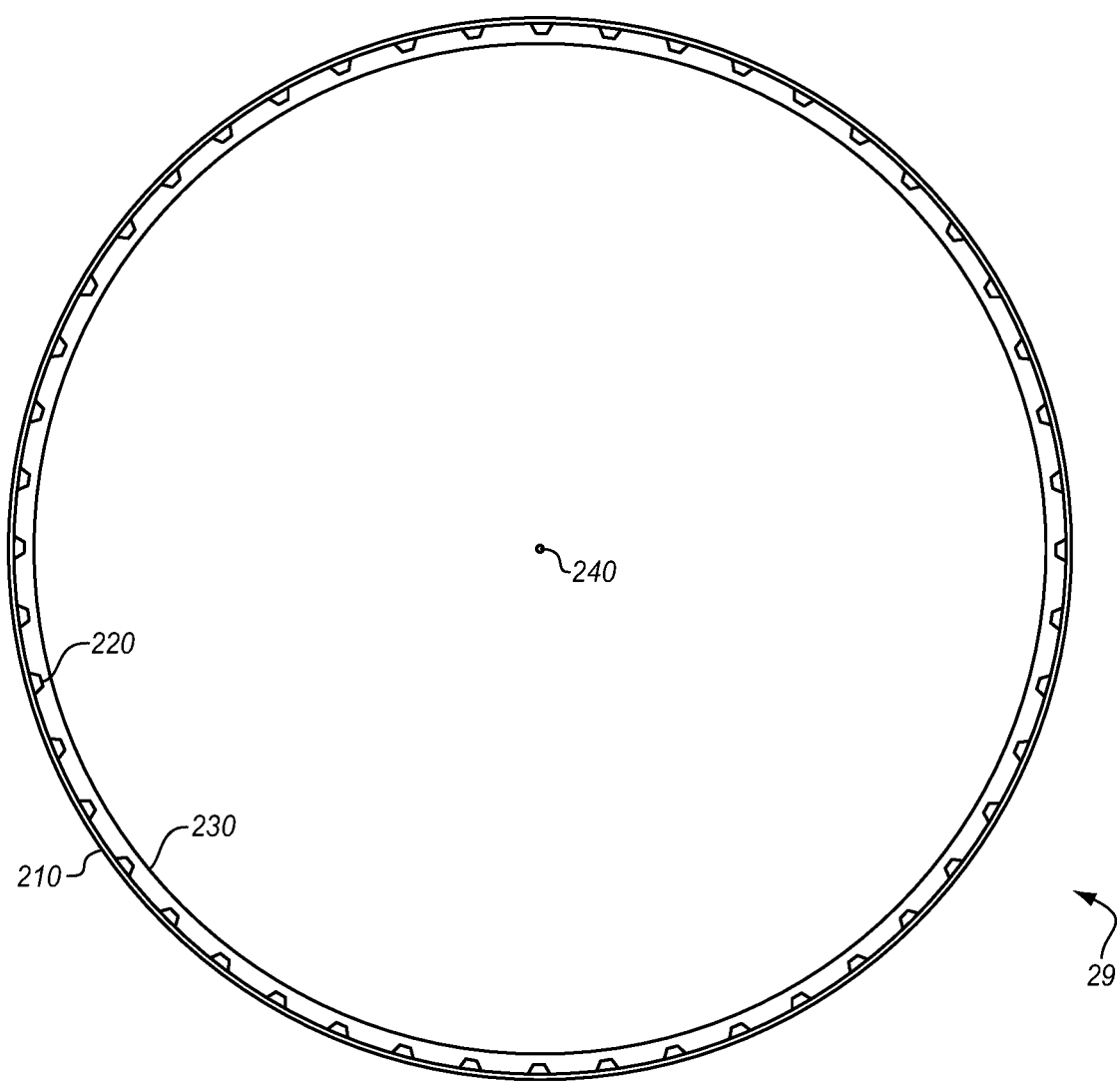
FIG. 2 illustrates a barrel section of an aircraft in an illustrative embodiment.

FIG. 2 illustrates a barrel section 29 in an illustrative embodiment, and corresponds with view arrows 2 of FIG. 1. Barrel section 29 includes a skin 210, which is structurally reinforced by the presence of frames 230 and stringers 220. The frames 230 extend circumferentially about the barrel section 29, and the stringers 220 extend perpendicular to the page at the barrel section 29. In this embodiment, the stringers 220 are arranged radially around a center 240 of the barrel section 29. During fabrication and/or assembly processes, the barrel section 29 may be subdivided into smaller fuselage sections that each comprise skin 210 accompanied by stringers 220, and frames 230 may be installed onto these fuselage sections. In one embodiment, the smaller fuselage sections have lengths of tens of feet (e.g., twenty feet to forty feet), and occupy a radial fraction of the barrel section 29 (e.g., resulting in a fuselage section that is arcuate, such as a half-barrel, quarter barrel, etc.).

Figure 3A:
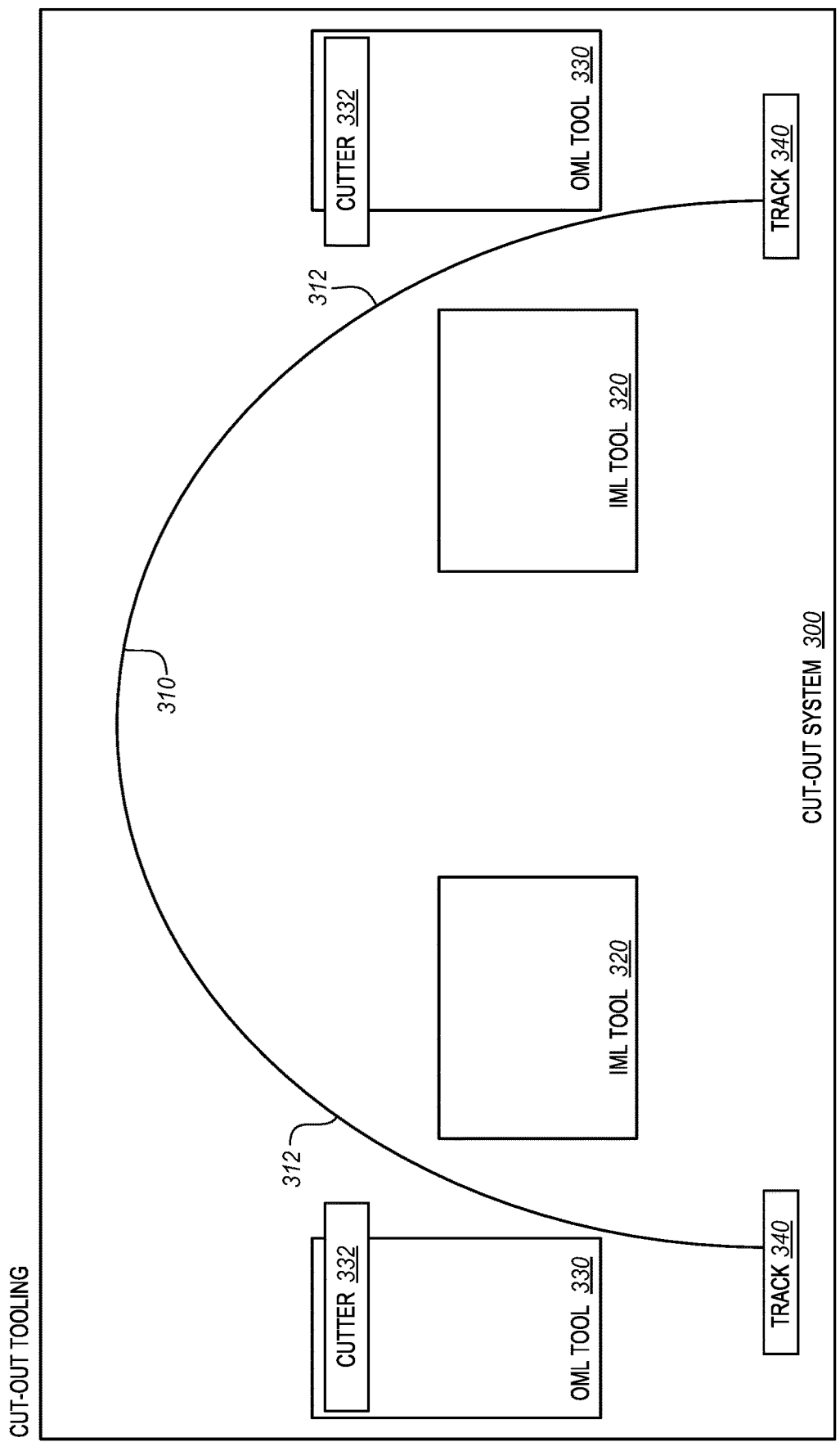
FIG. 3A is a block diagram of a cut-out system for an aircraft in an illustrative embodiment.

FIG. 3A is a block diagram of a cut-out system 300 in an illustrative embodiment. Cut-out system 300 comprises any system, device, or component operable to iteratively remove portions 312 from a fuselage section 310 that is fractionally pulsed in a process direction (e.g., into the page). As used herein, "pulsing" refers to iteratively advancing a fuselage section 310, followed by pausing advancement of the fuselage section. The fuselage section 310 is mounted to/supported by a track 340, and is fractionally pulsed in the process direction along track 340. The track 340 is any system, component, or device that is operable or configured to fractionally pulse the fuselage section 310 in the process direction by a predefined distance in a repeatable manner, and retain the fuselage section 310 in position for receiving work, e.g. during a pause between pulses. As used herein, a fuselage section 310 is "fractionally pulsed" when it is driven along the track 340 in the process direction by a distance that is less than the dimension of the fuselage section 310 that extends along the process direction. Usually, fuselage sections are disposed lengthwise along the process direction, so a fractional pulse is movement of the fuselage section 310 in the process direction by a distance less than its length. For example, in one embodiment the predefined distance corresponds with a distance between frame install locations (a "frame pitch distance"), such as twenty seven inches.

Between pulses, the fuselage section 310 is locked into place relative to the track 340 in order to receive work. The period of time between pulses, during which the fuselage section 310 remains stationary, is referred to as a pause. Each pause between fractional pulses may last for a predefined period of time (e.g. fifteen minutes, thirty minutes, etc.). During each of these pauses, cut-out system 300 removes one or more portions 312 from the fuselage section 310. In this embodiment, the cut-out system 300 includes an Inner Mold Line (IML) tool 320 and an Outer Mold Line (OML) tool 330. The IML tool 320 comprises machinery that is configured to interact with an IML of the fuselage section 310 (e.g., to grip the fuselage section 310 from the EVIL), and the OML tool 330 comprises machinery that is configured to interact with an OML of the fuselage section 310 (e.g., to cut into fuselage section 310 by driving a cutter through the OML). In this embodiment, the IML tool 320 grips the portion 312, and an OML tool 330 cuts out the portion 312 from the fuselage section 310. Specifically, after the IML tool 320 has successfully gripped a portion 312, an OML tool 330 operates a cutter 332 mounted to an actuator 336 in order to cut out the portion 312.

During operation, a drive mechanism (e.g., a motorized component of the track 340, an autonomous vehicle, gear drive, etc.), iteratively drives the fuselage section 310 in a process direction (e.g., into the page) along the track 340, which is disposed between the IML tool 320 and the OML tool 330, such that the fuselage section 310 remains disposed between the IML tool 320 and the OML tool 330. This reveals new portions of the fuselage section 310 for receiving work from the IML tool 320 and the OML tool 330.

Figure 3B:
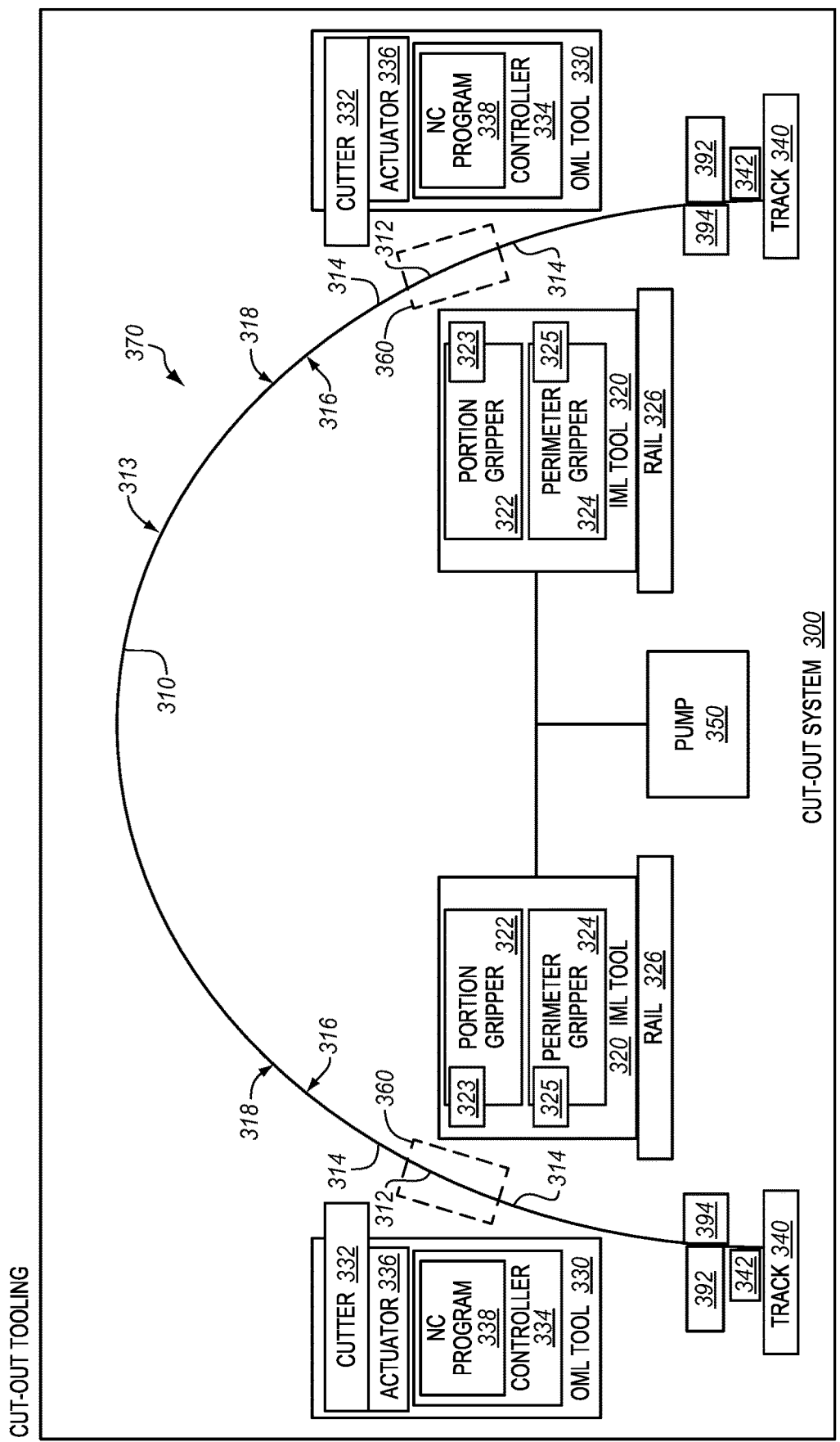
FIG. 3B is a further block diagram of a cut-out system for an aircraft in an illustrative embodiment.

FIG. 3B is a further block diagram of a cut-out system 300 in an illustrative embodiment. FIG. 3B depicts further components of a cut-out system 300 of FIG. 3A in one embodiment. In this embodiment, the cut-out system 300 removes portions 312 found within areas 360 of a fuselage section 310, and the fuselage section 310 is a half-barrel 370 of material 313 having an Inner Mold Line (IML) 316 and an Outer Mold Line (OML) 318.

In this embodiment, the track 340 includes rollers 342 that facilitate alignment of the fuselage section 310, and/or drive the fuselage section 310 along the track 340 in the process direction. In one embodiment, the rollers 342 comprise elements that rotate, yet are fixed in position at the track 340. Depending on the embodiment, the fuselage section 310 may be locked into place relative to the track via shot pins 392 at the track 340 that are driven into receptacles 394 at the fuselage section 310, or by other restraining means. Shot pins 392 comprise elements that are driven into place to mate with the receptacles 394. Receptacles comprise holes, indents, or other features that receive the shot pins 392. While the shot pins 392 are received, the mating of the shot pins 392 to the receptacles 394 prevents the fuselage section 310 from translating, because shot pins 392 physically obstruct movement of the fuselage section 310.

In this embodiment, the IML tool 320 includes a portion gripper 322 (e.g., comprising an end effector 323) such as a vacuum head that grips (e.g., applies suction to) the portion 312. The IML, tool 320 further includes a perimeter gripper 324 (e.g., comprising an end effector 325) such as a vacuum head that grips (e.g., applies suction to) an area 314 surrounding the portion 312. During cutting operations, the IML tool 320 grips both portion 312 and area 314 to stabilize the fuselage section 310 and/or dampen vibrations caused by cutting. After cutting has completed, the IML tool 320 releases its grip on the area 314, and is retracted away from the IML 316 via a rail 326. The portion 312 may then be removed from the IML tool 320 and disposed of. In one embodiment, the act of retraction is synchronized with the pulsing of the fuselage section 310, such that the IML tool 320 retracts as the fuselage section 310 is moved during a pulse.

In this embodiment, the cut-out system 300 includes multiple IML tools 320 that are disposed along the IML 316 and that are provided with suction via a pump 350. However, in further embodiments more or fewer IML tools 320 are provided to accommodate cut-outs for any suitable portions 312.

In this embodiment, the OML tools 330 are disposed along the OML 318 in alignment with corresponding IML tools 320. The OML tools 330 may comprise robot arms or other automated tools that perform operations in accordance with preprogrammed instructions. After an IML tool 320 has successfully gripped a portion 312, an OML tool 330 operates a cutter 332 mounted to an actuator 336 in order to cut out the portion 312. The cutter may comprise a rotating blade, reciprocating blade, a component that fires a pressurized jet of water, etc. In this embodiment, the cutter 332 is operated by a controller 334 to perform a series of predefined cuts indicated by a Numerical Control (NC) program 338. The cuts separate the portion 312 from the surrounding area 314. In one embodiment, controller 334 is implemented as custom circuitry, as a hardware processor executing programmed instructions stored in memory, or some combination thereof.

In this embodiment, to facilitate indexing of the cut-out system 300 to the fuselage section 310, rails 326 and OML tools 330 are mounted fixed relative to the track 340. Thus, when shot pins 392 hold the fuselage section 310 in position relative to the track, the OML tool 330 and IML tool 320 are disposed at known positions relative to the fuselage section 310.

The cut-out system 300 provides a technical benefit over prior systems and techniques, because it enables cut-outs to be repeatedly performed with great accuracy, and without the need to move its tools into alignment with each other and/or a fuselage section 310 after each cut is made. Instead, the fixed nature of the tools ensures that when the fuselage section 310 is locked into position relative to the track 340, the fuselage section 310 is ready to receive work specific to the portion of the fuselage section proximate the tools.

Figure 4:
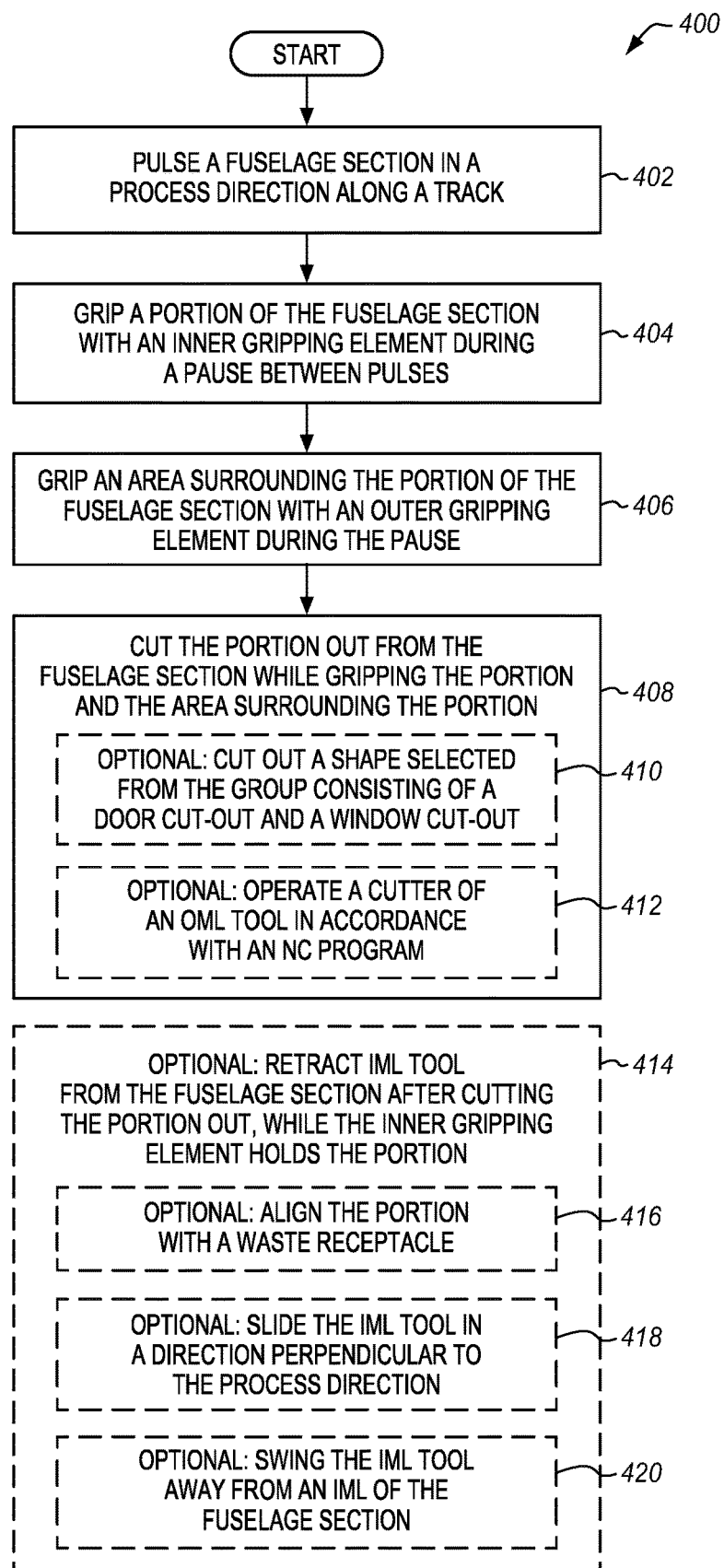
FIG. 4 is a flowchart illustrating a method for cutting out portions of a fuselage section in an illustrative embodiment.

Illustrative details of the operation of cut-out system 300 will be discussed with regard to FIG. 4, a flowchart that illustrates a method 400 for cutting out portions 312 of a fuselage section 310.

The steps of method 400 are described with reference to cut-out system 300 of FIG. 3, but those skilled in the art will appreciate that method 400 may be performed in other systems. The steps of the flowcharts described herein are not all inclusive and may include other steps not shown. The steps described herein may also be performed in an alternative order. Assume, for the following discussion of the method, that a fuselage section 310 has been loaded onto a track 340, and awaits the creation of window and/or door cut-outs at predefined locations.

Method 400 includes pulsing (e.g., fractionally pulsing), at 402, the fuselage section 310 in a process direction along a track 340. In one embodiment, this comprises driving the fuselage section 310 in the process direction (e.g., along the track 340) while the track 340 guides the fuselage section 310. In a further embodiment, this comprises operating the track 340 (e.g., via rollers 342 at the track 340) or other drive mechanism to drive the fuselage section 310 in the process direction. Depending on embodiment, the fuselage section 310 may be fractionally pulsed, may be pulsed by its full length, or by any other suitable distance.

After each pulse, advancement of the fuselage section 310 is paused. In one embodiment, this comprises halting the operation of rollers 342 in response to determining that the fuselage section 310 has advanced by a desired amount. Shot pins 392 are then aligned with receptacles 394, and are driven through the receptacles 394 to lock the fuselage section 310 in position in one embodiment. Additionally, IML, tools 320 are moved along rails 326 towards the IML 316 of the fuselage section 310 in one embodiment.

The method further includes gripping, at 404, a portion 312 of the fuselage section 310. In one embodiment, the gripping, at 404, is performed via inner gripping element 730 of FIG. 7 (e.g., portion gripper 322). Gripping may comprise applying suction, or any other suitable technique.

Figure 7:
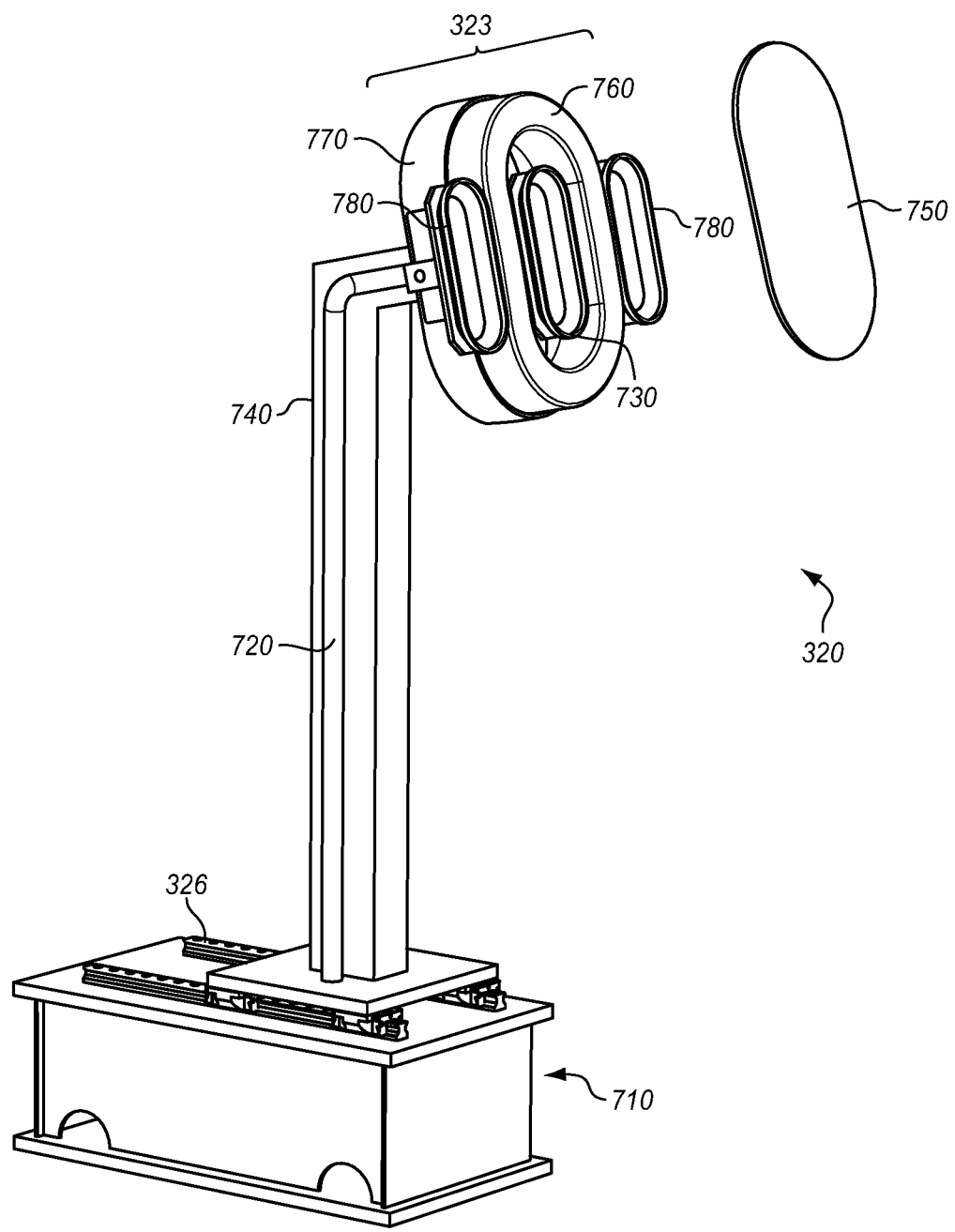
FIG. 7 is a perspective view of an Inner Mold Line (IML) tool that grips and removes a portion of a fuselage section in an illustrative embodiment.

The method further includes gripping, at 406, an area 314 surrounding the portion 312, with an outer gripping element 780 of FIG. 7 (e.g., perimeter gripper 324). With the portion 312 stabilized against vibration by this multi-grip process, the portion 312 is ready for cutting.

Method 400 further includes cutting, at 408, the portion 312 out from the fuselage section 310 while gripping the portion 312 and the area 314 surrounding the portion. In one embodiment, cutting the portion 312 out comprises cutting, at 410, out a shape selected from the group consisting of a door cut-out and a window cut-out. In a further embodiment, cutting, at 408, the portion out comprises operating, at 412, a cutter 332 at the OML tool 330 in accordance with the NC program 338.

After cutting has completed, the IML tool 320 releases its grip on the area 314 without releasing the grip on portion 312. Then, in one embodiment, the method 400 further comprises retracting, at 414, the IML tool 320 and the portion 312 from the fuselage section 310. This operation is performed after cutting the portion 312 out from the fuselage section 310, and hence the portion 312 is now a distinct piece of material, that is separate from the fuselage section 310, and is carried by the IML tool 320 (i.e., at inner gripping element 780 of FIG. 7). Because the IML tool 320 holds (e.g., maintains its grip on) the portion 312 after the portion 312 has been cut out from the fuselage section 310, movement of the IML tool 320 also moves the portion 312 that is being gripped. In one embodiment, retracting the IML tool 320 comprises aligning, at 416, the portion 312 with a waste receptacle, and/or sliding, at 418, the IML tool 320 in a direction perpendicular to the process direction. In one embodiment, retracting the IML tool 320 comprises swinging, at 420, the IML tool 320 away from the IML 316 of the fuselage section 310.

Method 400 provides a technical benefit over prior systems and techniques, because it enables for cutting operations to be reliably and repeatedly performed with minimal delay. For example, there is no longer any need to align an IML tool with an OML tool each time a cut is made, because these tools operate in the same coordinate system (i.e., the coordinate system of the track 340).

Figure 5:
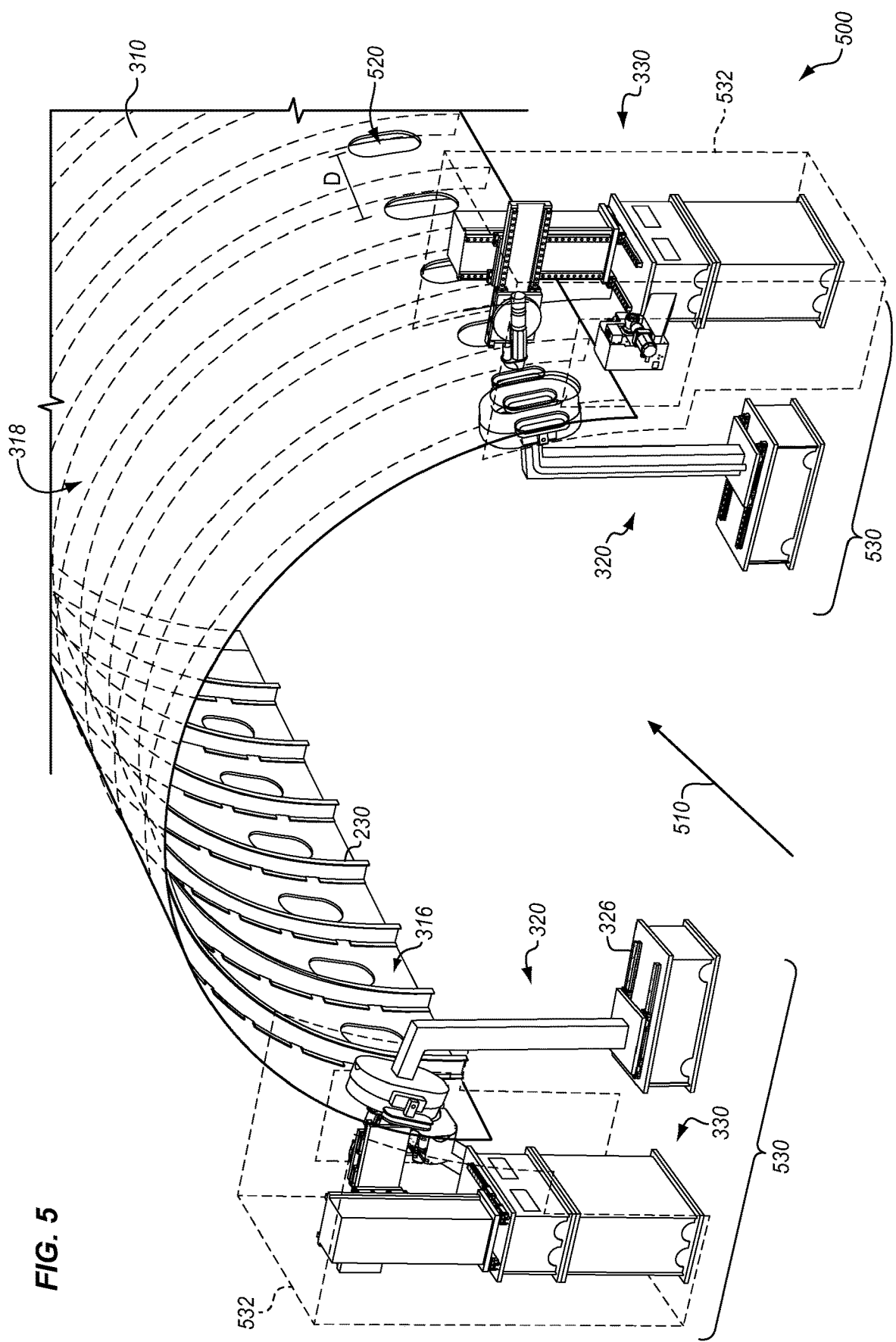
FIG. 5 is a perspective view of window cut-out stations at an assembly line in an illustrative embodiment.

FIG. 5 is a perspective view of window cut-out stations 530 at an assembly line 500 in an illustrative embodiment. For simplicity, much of the supporting structure of assembly line 500 is not shown in this view. In this embodiment, a fuselage section 310, which includes frames 230 attached at an upstream station, is advanced (e.g., fractionally pulsed) in a process direction 510 incrementally by a distance D. In each pause between pulses, the cut-out stations remove material to form window cut-outs 520. In this embodiment, the window cut-out stations 530 each comprise an IML tool 320 and OML tool 330. The OML tools 330 are surrounded by safety cages 532, and the IML tools 320 slide along rails 326 to engage and/or disengage with the IML 316 of the fuselage section 310.

Figure 6:
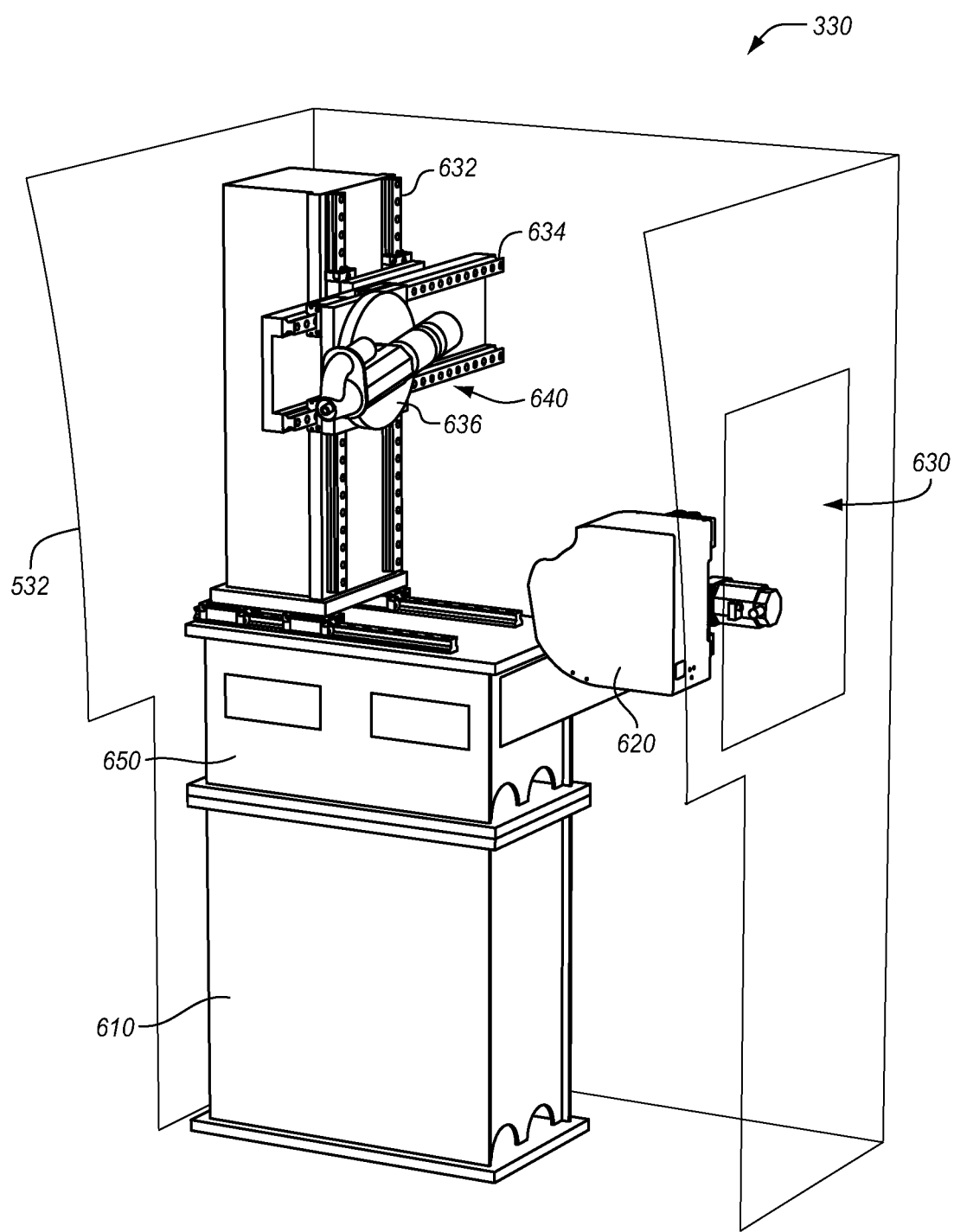
FIG. 6 is a perspective view of an Outer Mold Line (OML) tool that cuts out a portion of a fuselage section in an illustrative embodiment.

FIG. 6 is a perspective view of an OML tool 330 that cuts out a portion 312 of a fuselage section 310 in an illustrative embodiment. In this embodiment, the OML tool 330 comprises a head assembly 650 which is mounted to a plinth 610. The head assembly 650 includes a router 640, which is adjustable along four axes via rails 632, rails 634, and rotary table 636. An Automatic Tool Changer (ATC) 620 changes router 640 for any other suitable tools, and is accessible via an access door 630 in the safety cage 532. For example, the ATC 620 may be operated to exchange any routers 640 that are dull for new ones, or to exchange any routers 640 that perform a rough cut with routers 640 that perform a precise cut.

FIG. 7 is a perspective view of an IML tool 320 that grips and removes a portion 312 of a fuselage section 310 in an illustrative embodiment. In this embodiment, the IML tool 320 grips and removes a portion 312 in the form of a window cut-out 750. The IML tool 320 is mounted to rails 326, which are affixed to a base 710. In this embodiment, the IML tool 320 includes post 740, to which an end effector 323 is attached. The end effector 323 includes support tooling 760 that mates with an IML 316 of a fuselage section 310, and also includes a vacuum port 770 which removes dust and debris accumulated during cutting operations. Dust and debris are removed from the vacuum port 770 via a dust collection tube 720 that is mounted to the post 740. In this embodiment, the end effector 323 includes inner gripping element 730 (e.g., a suction cup or vacuum port), which grip the window cut-out 750. The end effector 323 also includes outer gripping elements 780 (e.g., suction cups or vacuum ports), which grip an area 314 that surrounds the window cut-out 750. In further embodiments, end effector 323 solely houses the inner gripping elements 730, which are an embodiment of portion gripper 322. In such embodiments, an additional end effector 325 houses the outer gripping elements 780, which are an embodiment of perimeter gripper 324.

Figure 8:
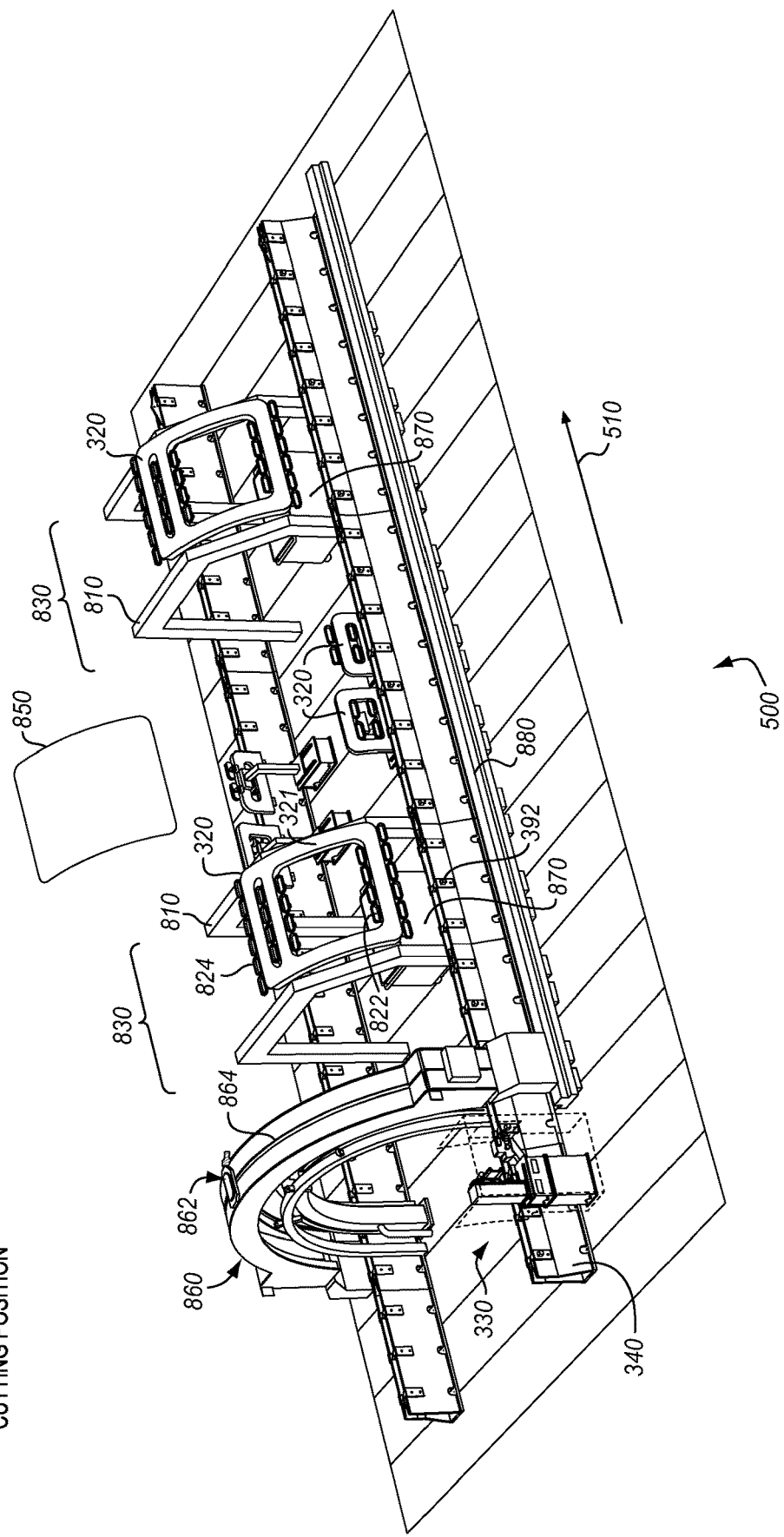
FIG. 8 is a perspective view of door cut-out stations at an assembly line in an illustrative embodiment.

FIG. 8 is a perspective view of door cut-out stations 830 at an assembly line 500 in an illustrative embodiment. In this embodiment, the door cut-out stations 830 each comprise an IML, tool 320, which is mounted to a support 810 along a fuselage section of track 340 having shot pins 392. Each IML tool 320 includes a frame 321, which supports inner suction cups 822 and outer suction cups 824. The inner suction cups 822 grip a portion 312 in the form of a door cut-out 850 being removed from a fuselage section 310, while the outer suction cups 824 grip an area 314 surrounding the door cut-out 850. Some of the IML tools 320 are rotationally affixed to supports 810, and swing away from an IML 316 of the fuselage section 310 after cutting operations have completed. This aligns the IML tools 320 with waste receptacles 870, enabling easy disposal of the door cut-outs 850. Such a configuration may be particularly desirable when cutting out cargo doors. Other IML tools 320 are not mounted to supports 810, and may be utilized to cut out a portion of a door that bridges two of the fuselage sections 310 (e.g., a top fuselage section and a bottom fuselage section).

The cut-out stations 830 share an OML tool 330, which in this embodiment comprises a cutter 862 mounted to a gantry 860. The cutter 862 moves along track 864 at the gantry to achieve a desired circumferential position along the gantry 860. Furthermore, the gantry 860 is capable of moving along track 880 in the process direction 510 as desired. This enables the gantry 860 to move to each IML tool 320 and perform cutting operations as desired during a pause between pulses of the fuselage section. While the drawings discussed above show embodiments that implement movement of fuselage sections by means of fractional pulsing, the cut-out stations 830 for doors described herein may be operated according to a "full pulse," wherein an entire fuselage section 310 is moved in the process direction by a distance equal to, or more than, its length into position at the cut-out stations 830, and then worked upon. In one embodiment, the pause between full pulses is equal to the sum of pauses between fractional pulses that would have occurred if the fuselage section 310 had been fractionally pulsed.

In many embodiments, only a fraction of cut-outs permitted by the IML, tools 320 are performed. That is, a different combination of cut-outs may be performed at cut-out stations 830 for fuselage sections 310 having different designs, such that a cut-out for a cargo door or passenger door is made for some fuselage sections 310, but not others. This increases the ability of the assembly line 500 to process a variety of different fuselage sections 310 for different portions of an aircraft, and/or for entirely different aircraft.

Figure 9:
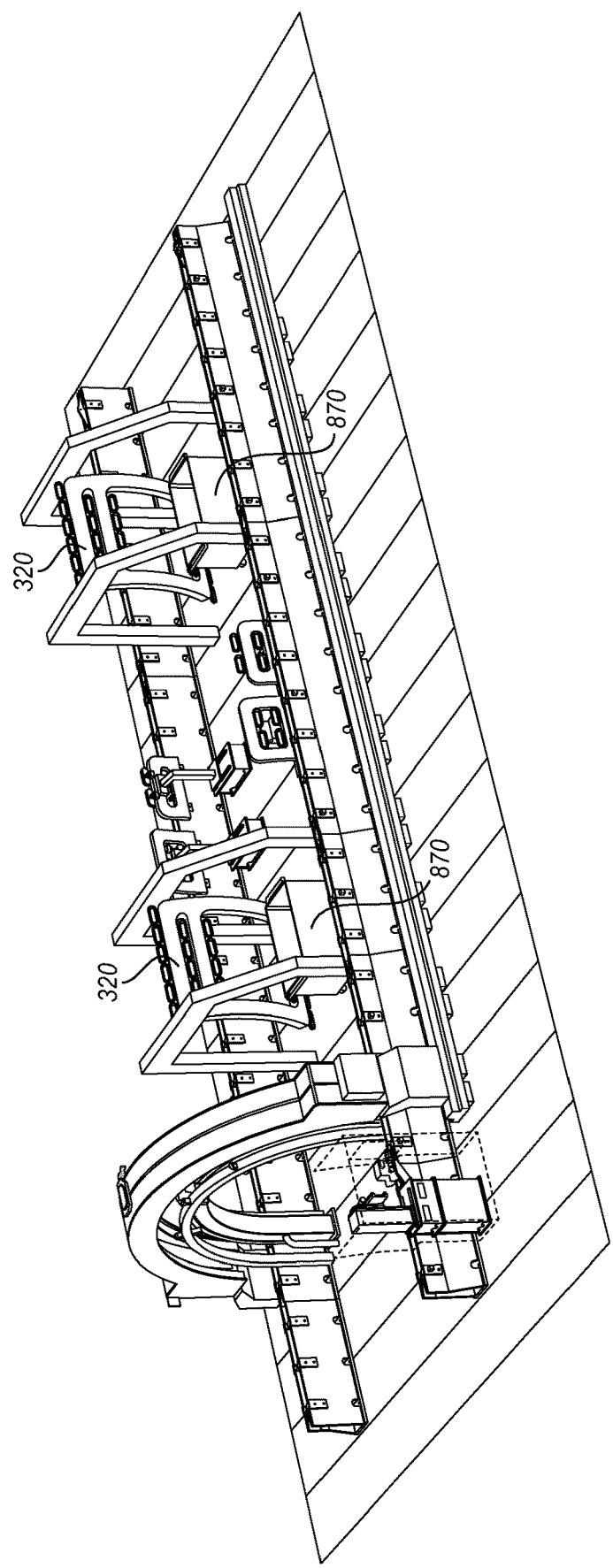
FIG. 9 is a further perspective view of door cut-out stations at an assembly line in an illustrative embodiment.

FIG. 9 is a further perspective view of cut-out stations 830 for doors at an assembly line in an illustrative embodiment. In this embodiment, some of the IML tools 320 have swung (i.e., pivoted) about supports 810, aligning the IML tools 320 with a waste receptacle 870.

Figure 10A:
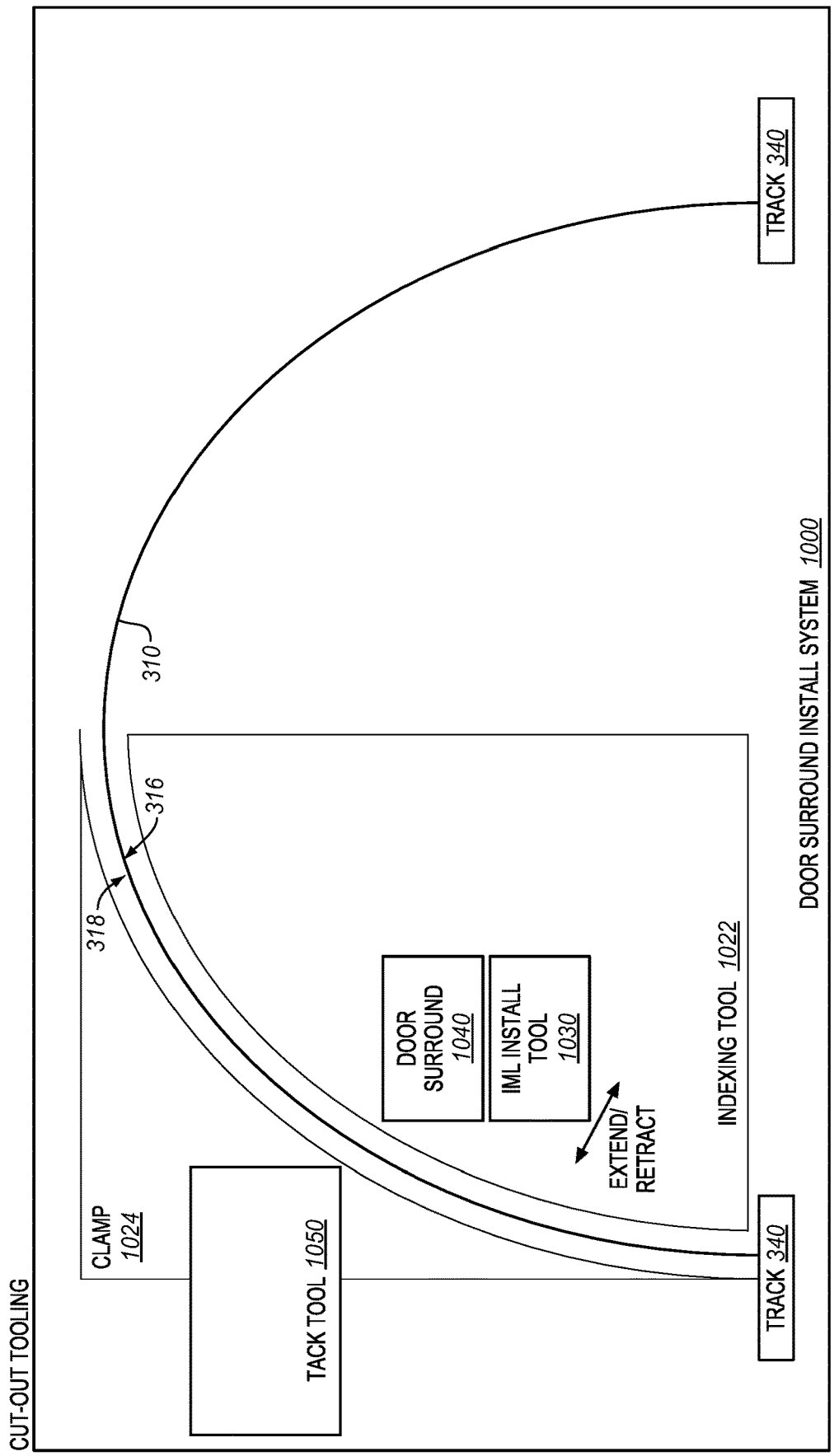
FIG. 10A is a block diagram of a door surround install system for an aircraft in an illustrative embodiment.

With a full discussion of cut-out processes for windows and doors provided above, the drawings discussed below illustrate systems and processes for installing door surrounds. FIG. 10A is a block diagram of a door surround install system 1000 for an aircraft in an illustrative embodiment. The door surround install system 1000 installs a door surround 1040 at a fuselage section 310. A door surround 1040 comprises components that structurally support the installation and operation of a door into the fuselage section 310.

In this embodiment, the door surround install system 1000 includes an indexing tool 1022, and further includes a clamp 1024 that presses against an OML 318 of the fuselage section 310 to hold the fuselage section 310 in a desired contour against the indexing tool 1022. The indexing tool 1022 comprises a component that presses the fuselage section 310 into conformance with a desired contour from an IML. The clamp 1024 comprises a component that holds the fuselage section 310 in contact with the indexing tool 1022. While the fuselage section 310 is clamped, an IML install tool 1030 extends to hold the door surround 1040 in contact with the IML 316. While the door surround 1040 is held in contact, a tack tool 1050 affixes the door surround 1040 to the fuselage section 310.

A track 340 supports the fuselage section 310, and is disposed between the indexing tool 1022 and the clamp 1024. The track 340 drives the fuselage section 310 in the process direction, such that the fuselage section 310 remains disposed between the indexing tool 1022 and the clamp 1024.

Figure 10B:
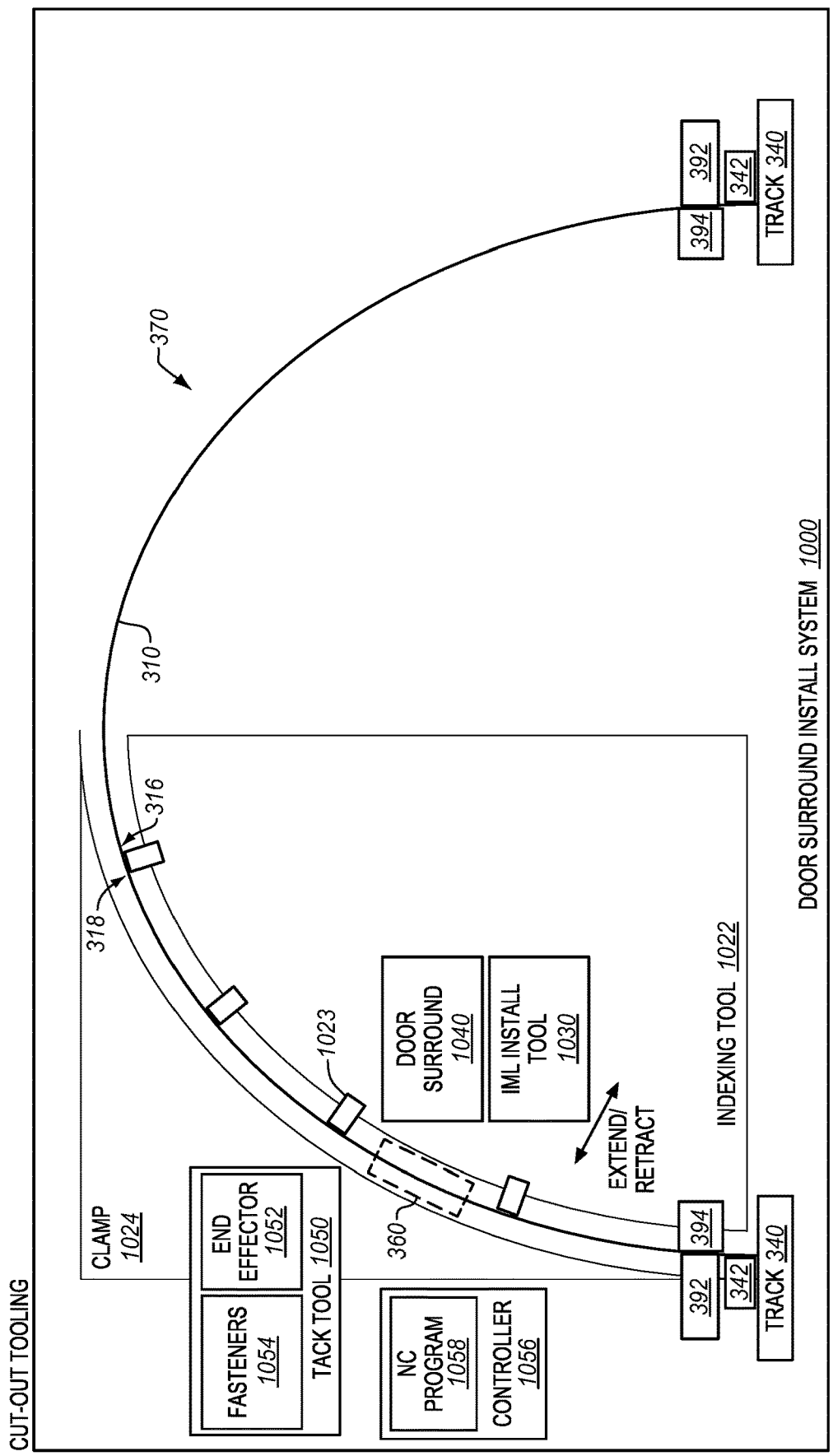
FIG. 10B is a further block diagram of a door surround install system for an aircraft in an illustrative embodiment.

FIG. 10B is a further block diagram of a door surround install system for an aircraft in an illustrative embodiment. In this embodiment, the door surround install system 1000 installs a door surround 1040 into an area 360 which has been cut out from a fuselage section 310. Furthermore, in this embodiment, the indexing tool 1022 includes indexing elements 1023 that mate with an IML 316 of the fuselage section 310.

While the door surround 1040 is held in contact, a tack tool 1050 operates an end effector 1052 to drive the fasteners 1054 through the fuselage section 310 and the door surround 1040. This affixes the door surround 1040 to the fuselage section 310. In one embodiment, the tack tool 1050 installs the fasteners 1054 and/or adjusts its position based on an NC program 1058 stored in a controller 1056.

Illustrative details of the operation of door surround install system 1000 will be discussed with regard to FIG. 11. Assume, for this embodiment, that a fuselage section 310 has been loaded onto a track 340, and has been moved along the track and processed until the fuselage section 310 includes a cut-out for receiving a door surround 1040.

FIG. 11 is a flowchart illustrating a method 1100 for installing a door surround 1040 onto a fuselage section 310 in an illustrative embodiment. The method 1100 includes pulsing, at 1102, the fuselage section 310 in a process direction along a track 340. In one embodiment, this comprises driving the fuselage section 310 in the process direction while the track 340 guides the fuselage section. In a further embodiment, this comprises operating the track 340 (e.g., via rollers 342 at the track 340) to drive the fuselage section 310 in the process direction. Depending on embodiment, the fuselage section 310 may be fractionally pulsed, may be pulsed by its full length, or by any other suitable distance.

After each pulse, advancement of the fuselage section 310 is paused. In one embodiment, this comprises halting the operation of rollers 342 in response to determining that the fuselage section 310 has advanced by a desired amount. Shot pins 392 are then aligned with receptacles 394, and are driven through the receptacles 394 to lock the fuselage section 310 in position.

The method also includes aligning, at 1106, the fuselage section 310 by gripping the fuselage section 310 at an IML 316 and an OML 318 of the fuselage section 310. In one embodiment, the gripping is accomplished by pressing indexing elements 1023 into the IML 316, and by pressing clamp 1024 against an OML 318 of the fuselage section 310. Method 1100 optionally includes holding 1107 the fuselage section 310 in compliance with a desired contour, which is accomplished by the gripping. The gripping also prevents translation of the fuselage section 310 during installation of fasteners 1054.

The method further includes holding, at 1108, a door surround 1040 at the IML 316 of the fuselage section 310 via the IML install tool 1030. In one embodiment, this comprises extending the IML install tool 1030 towards the IML 316 until the door surround 1040 contacts the IML 316.

Method 1100 further includes fastening, at 1110, the door surround 1040 to the fuselage section 310. In one embodiment, this comprises aligning tack tool 1050 with the door surround 1040, and driving the fasteners 1054 through the door surround 1040 and the fuselage section 310. In one embodiment, the fasteners 1054 comprise temporary fasteners that are later drilled out and filled with permanent fasteners. In further embodiments, the fasteners 1054 comprise lockbolts or rivets.

Method 1100 also includes retracting, at 1112, the IML install tool 1030 from the fuselage section 310. This prevents the IML install tool 1030 from physically interfering with any frames 230 and/or stringers 220 at the fuselage section 310 when the fuselage section 310 is further advanced along the track 340. In one embodiment, the act of retraction is synchronized with the pulsing of the fuselage section 310, such that the IML install tool 1030 retracts as the fuselage section 310 is moved during a pulse.

The operations of method 1100 provide a technical benefit over prior systems and techniques, because they enable door surround installation to be reliably and repeatedly performed with minimal delay. For example, there is no longer any need to align a tack tool 1050 with an IML install tool 1030 each time a door surround 1040 is installed, because these tools operate in the same coordinate system (i.e., the coordinate system of the track 340).

Figure 12:
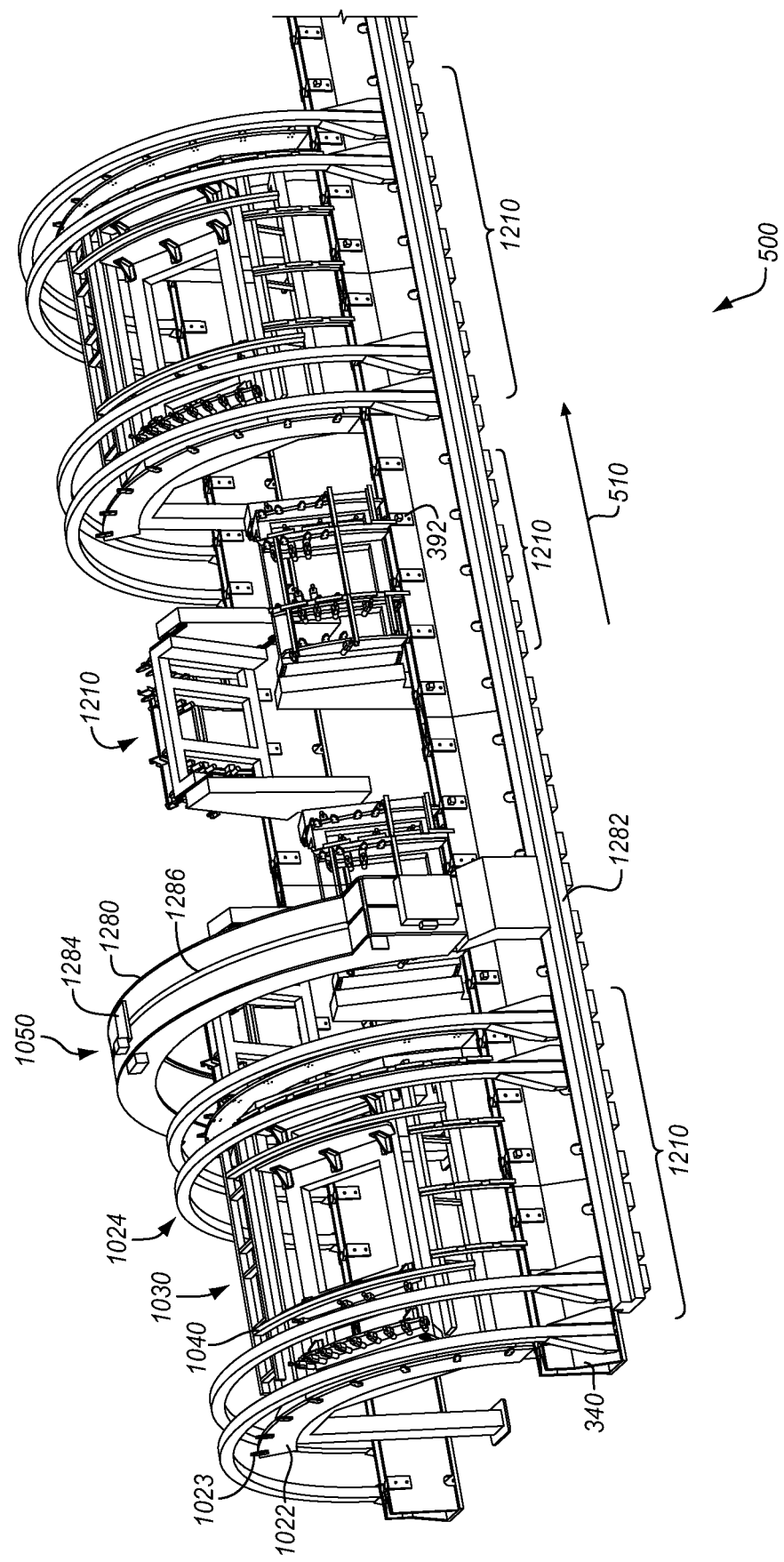
FIG. 12 is a perspective view of an assembly line that includes a door surround station in an illustrative embodiment.

FIG. 12 is a perspective view of an assembly line 500 that includes door surround stations 1210 in an illustrative embodiment. In this embodiment, each door surround station 1210 includes an indexing tool 1022 having indexing elements 1023, and further includes a clamp 1024 that presses against an OML 318 of a fuselage section 310. Each door surround station 1210 also includes an IML, install tool 1030, which holds a door surround 1040. In this embodiment, the tack tool 1050 comprises a gantry 1280 that roves between the door surround stations 1210 along track 1282. The tack tool 1050 includes an end effector 1284 that moves along track 1286 in gantry 1280, in order to align with desired fastener install locations. In one embodiment, the tack tool 1050 installs the fasteners 1054 and adjusts the position of end effector 1284 based on the NC program 1058.

Figure 13:
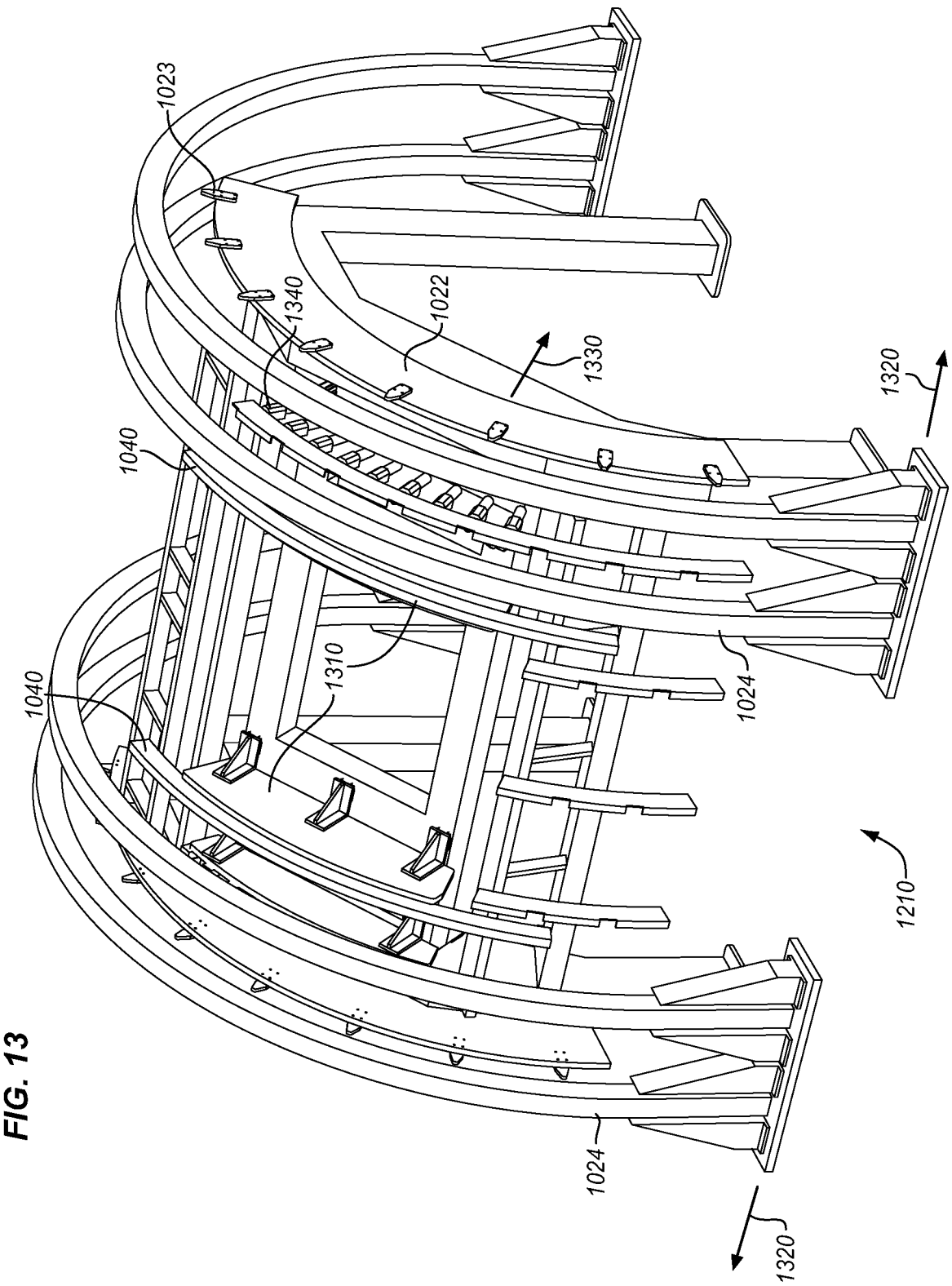
FIG. 13 is a further perspective view of a door surround station in an illustrative embodiment.

FIG. 13 is a further perspective view of a door surround station 1210 in an illustrative embodiment. This view illustrates that the IML install tool 1030 includes form boards 1310, which are structural members that hold the door surround 1040 in a desired contour prior to installation. In this embodiment, the IML install tool 1030 also includes actuators 1340 that press the door surround 1040 into contact with the IML 316. Actuators 1340 may comprise electrically, pneumatically, or hydraulically controlled elements that controllably extend and/or retract. FIG. 13 further illustrates that in one embodiment, indexing tools 1022 retract in direction 1330 away from an IML 316 of a fuselage section after a door surround 1040 has been installed. Clamps 1024 may also be moved in directions 1320 to facilitate loading operations.

Figure 14:
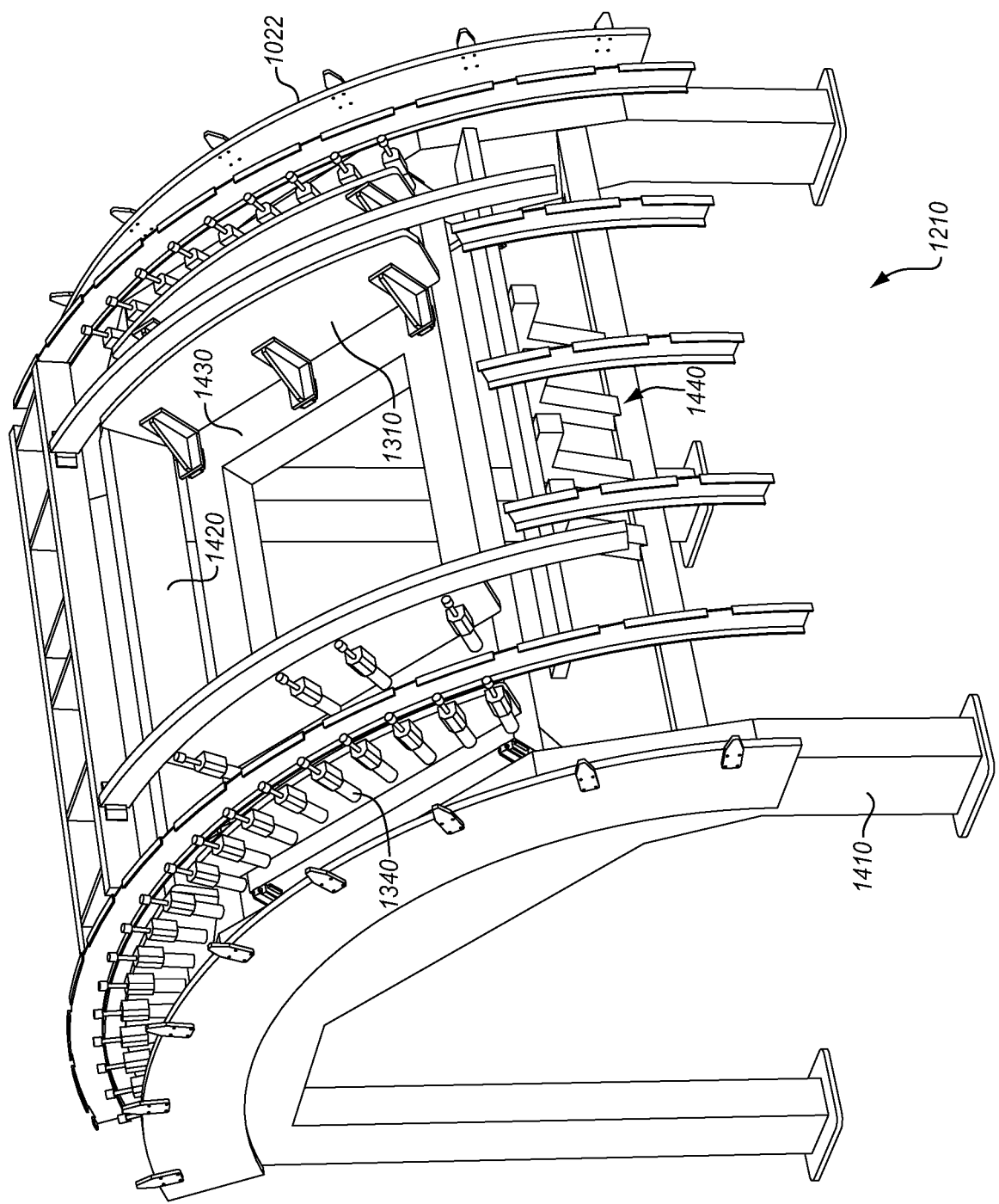
FIG. 14 is a further perspective view of a door surround station in an illustrative embodiment.
Figure 15:
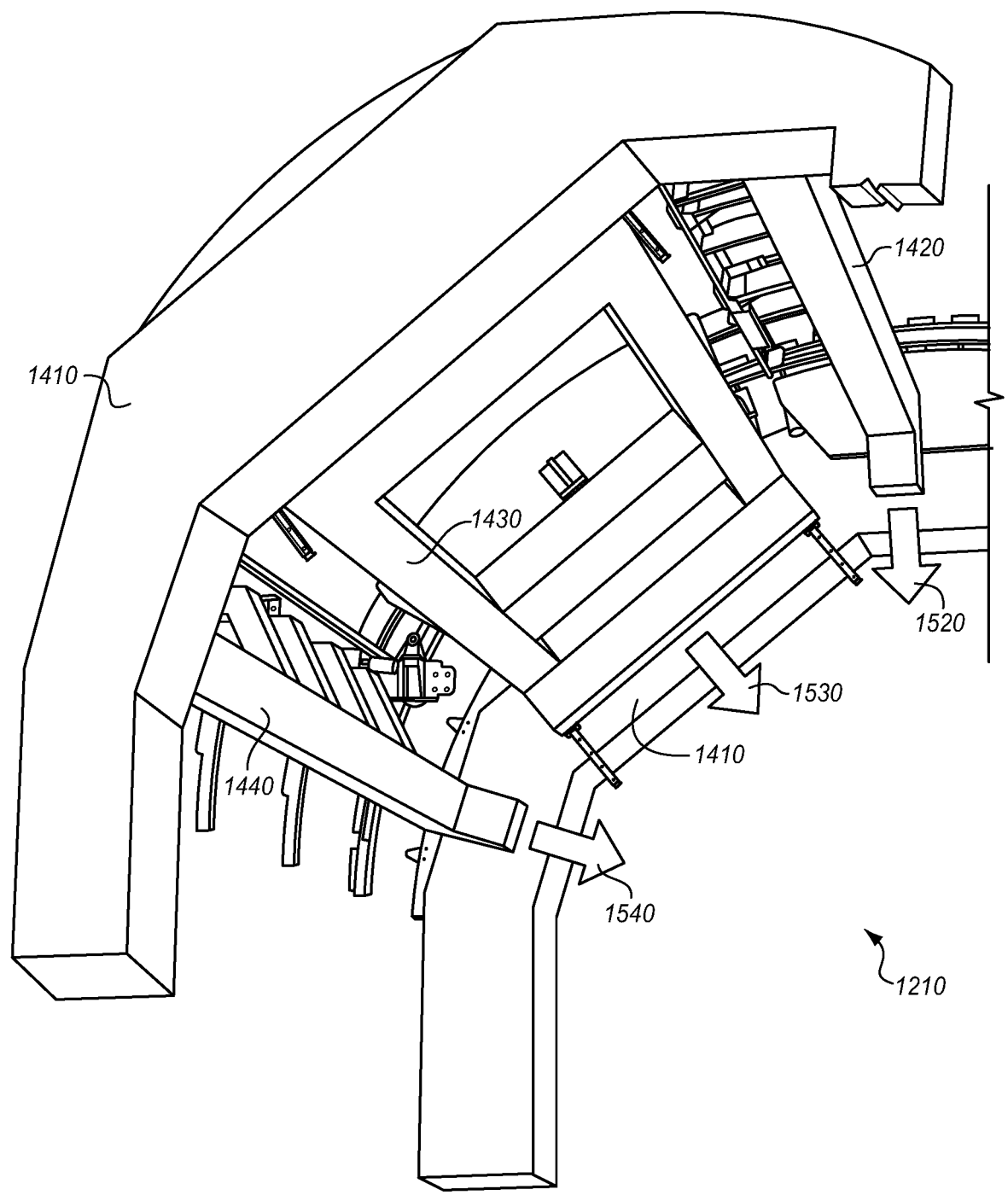
FIG. 15 is an interior view of a door surround station that is retracting from an IML, of a fuselage section in an illustrative embodiment.

FIG. 14 is a further perspective view of a door surround station 1210 in an illustrative embodiment. The door surround station 1210 includes a support 1410, to which retractable members 1420, 1430, and 1440 are attached. The form boards 1310 are attached to retractable member 1430. The retractable members 1420, 1430, and 1440 are movably attached to the support 1410. Specifically, the retractable members 1420, 1430, and 1440 are capable of extending towards an IML 316 of a fuselage section 310 to place a door surround 1040 against the IML 316 for installation, and are capable of retracting from the IML 316 of the fuselage section 310 to permit the fuselage section 310 to advance. This feature is further shown in FIG. 15, which is an interior view of a door surround station 1210 that is retracting from an IML 316 of a fuselage section 310 in an illustrative embodiment. The retractable member 1420 retracts in direction 1520, the retractable member 1430 retracts in direction 1530, and the retractable member 1440 retracts in direction 1540.

The door surround systems discussed herein provide a notable benefit over prior systems, because they enable tack tools 1050 and IML install tools 1030 to operate in the same coordinate system (e.g., that of track 340), which eliminates the need to align these tools with each other each time a door surround 1040 is installed.

EXAMPLES

In the following examples, additional processes, systems, and methods are described in the context of assembly lines for aircraft.

Figure 16:
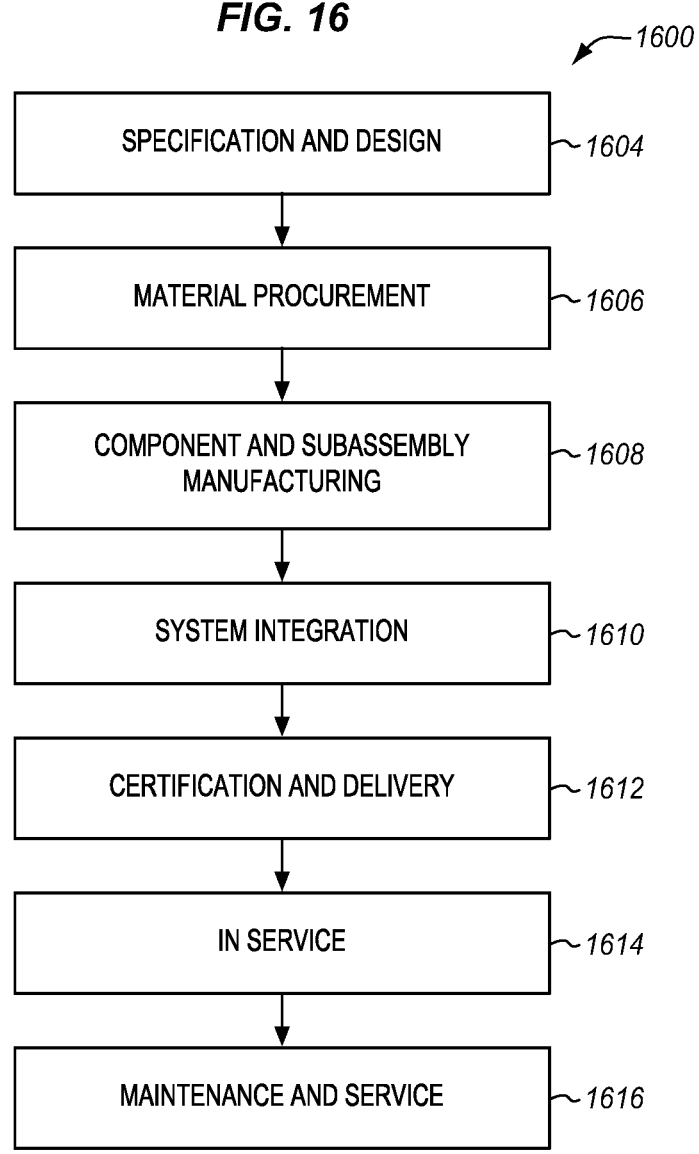
FIG. 16 is a flow diagram of aircraft production and service methodology in an illustrative embodiment.
Figure 17:
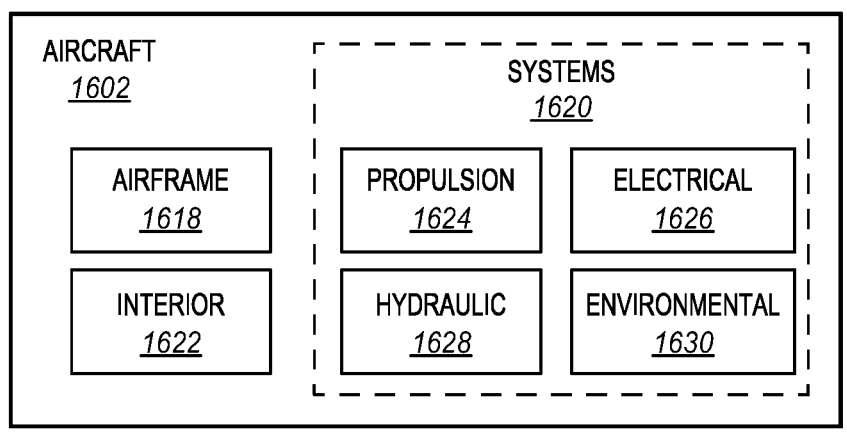
FIG. 17 is a block diagram of an aircraft in an illustrative embodiment.

Referring more particularly to the drawings, embodiments of the disclosure may be described in the context of aircraft manufacturing and service in method 1600 as shown in FIG. 16 and an aircraft 1602 as shown in FIG. 17. During pre-production, method 1600 may include specification and design 1604 of the aircraft 1602 and material procurement 1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine work in maintenance and service 1616 (which may also include modification, reconfiguration, refurbishment, and so on). Apparatus and methods embodied herein may be employed during any one or more suitable stages of the production and service described in method 1600 (e.g., specification and design 1604, material procurement 1606, component and subassembly manufacturing 1608, system integration 1610, certification and delivery 1612, service 1614, maintenance and service 1616) and/or any suitable component of aircraft 1602 (e.g., airframe 1618, systems 1620, interior 1622, propulsion system 1624, electrical system 1626, hydraulic system 1628, environmental system 1630).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1602 produced by method 1600 may include an airframe 1618 with a plurality of systems 1620 and an interior 1622. Examples of systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1600. For example, components or subassemblies corresponding to component and subassembly manufacturing 1608 may be fabricated or manufactured in a manner similar to components or subassemblies produced while the aircraft 1602 is in service. Also, one or more apparatus embodiments, method embodiments, or a combination thereof may be utilized during the subassembly manufacturing 1608 and system integration 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation during the maintenance and service 1616. Thus, the invention may be used in any stages discussed herein, or any combination thereof, such as specification and design 1604, material procurement 1606, component and subassembly manufacturing 1608, system integration 1610, certification and delivery 1612, service 1614, maintenance and service 1616 and/or any suitable component of aircraft 1602 (e.g., airframe 1618, systems 1620, interior 1622, propulsion system 1624, electrical system 1626, hydraulic system 1628, and/or environmental system 1630).

In one embodiment, a part comprises a portion of airframe 1618, and is manufactured during component and subassembly manufacturing 1608. The part may then be assembled into an aircraft in system integration 1610, and then be utilized in service 1614 until wear renders the part unusable. Then, in maintenance and service 1616, the part may be discarded and replaced with a newly manufactured part. Inventive components and methods may be utilized throughout component and subassembly manufacturing 1608 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof,

What is claimed is:

1. A system for cutting out portions of a fuselage section, the system comprising:
    an Inner Mold Line (IML) tool comprising an inner gripping element configured to apply suction to a portion of the fuselage section, and further comprising an outer gripping element configured to apply suction to an area surrounding the portion;
    an Outer Mold Line (OML) tool configured to operate a cutter to cut the portion out from the fuselage section while suction is applied to the portion and to the area surrounding the portion; and
    a track that is disposed between the IML tool and the OML tool, wherein the fuselage section is configured to be pulsed in a process direction along the track, such that the fuselage section remains disposed between the IML tool and the OML tool when pulsed in the process direction.

2. The system of claim 1 wherein:
    the inner gripping element and outer gripping element are configured to apply suction during a pause between pulses, and the OML tool operates the cutter during the pause.

3. The system of claim 1 wherein:
    the outer gripping element is configured to release suction applied to the area surrounding the portion after the portion has been cut out from the fuselage section, and the IML tool is configured to retract away from the fuselage section while the inner gripping element holds the portion after the portion has been cut out.

4. The system of claim 3 wherein:
    the IML tool is further configured to retract away from the fuselage section synchronized with pulsing of the fuselage section.

5. The system of claim 1 wherein:
    the OML tool is configured to move the cutter during cutting in accordance with a Numerical Control (NC) program.

6. The system of claim 1 wherein:
    the portion is selected from the group consisting of a door cut-out and a window cut-out.

7. The system of claim 1 wherein:
    the outer gripping element is selected from the group consisting of: a vacuum port and a suction cup.

8. The system of claim 1 wherein:
    the OML tool is mounted to a gantry that moves along the track in the process direction during a pause between pulses.

9. The system of claim 1 wherein:
    the cutter comprises a blade.

10. The system of claim 1 wherein:
    the cutter comprises a pressurized jet of water.

11. The system of claim 1 wherein:
    the track comprises one or more shot pins configured to engage with one or more receptacles of the fuselage to lock the fuselage into place relative to the track during a pause between pulses.

12. A method for cutting out portions of a fuselage section, the method comprising:
    pulsing the fuselage section in a process direction along a track;
    gripping a portion of the fuselage section with an inner gripping element during a pause between pulses;
    gripping an area surrounding the portion with an outer gripping element during the pause; and
    cutting the portion out from the fuselage section while gripping the portion and the area surrounding the portion.

13. The method of claim 12 wherein:
    the inner gripping element and outer gripping element are disposed at an Inner Mold Line (IML) tool, and the method further comprises:
    after the portion has been cut out from the fuselage section, retracting the IML tool from the fuselage section, while the inner gripping element holds the portion.

14. The method of claim 13 wherein:
    retracting the IML tool comprises aligning the portion with a waste receptacle.

15. The method of claim 13 wherein:
    retracting the IML tool comprises sliding the IML tool in a direction perpendicular to the process direction.

16. The method of claim 13 wherein:
    retracting the IML tool comprises swinging the IML tool away from an inner mold line of the fuselage section.

17. The method of claim 13 wherein:
    retracting the IML tool is synchronized with the pulsing of the fuselage section to retract the IML tool as the fuselage section is moved during a pulse.

18. The method of claim 12 wherein:
    cutting the portion out comprises cutting out a shape selected from the group consisting of a door cut-out and a window cut-out.

19. The method of claim 12 wherein:
    cutting the portion out comprises operating a cutter at an Outer Mold Line (OML) tool in accordance with a Numerical Control (NC) program.

20. The method of claim 12 further comprising:
engaging a shot pin of the track with a receptacle of the fuselage to lock the fuselage into place relative to the track during a pause between pulses.

\* \* \* \* \*